United States Patent
Mochizuki

(10) Patent No.: US 7,325,714 B2
(45) Date of Patent: Feb. 5, 2008

(54) SOLDER HEATING SYSTEM

(75) Inventor: Toshikazu Mochizuki, Sakai (JP)

(73) Assignee: Hakko Corporation, Osaka (JP)

( * ) Notice: Subject to any disclaimer, the term of this patent is extended or adjusted under 35 U.S.C. 154(b) by 99 days.

(21) Appl. No.: 10/816,231

(22) Filed: Mar. 31, 2004

(65) Prior Publication Data
US 2005/0218197 A1 Oct. 6, 2005

(51) Int. Cl.
B23K 1/018 (2006.01)
(52) U.S. Cl. .................. 228/19; 228/20.1; 228/51; 228/52
(58) Field of Classification Search ........ 228/20.5
See application file for complete search history.

(56) References Cited

U.S. PATENT DOCUMENTS

| | | | | |
|---|---|---|---|---|
| 3,211,354 A | * | 10/1965 | Dugard et al. | 228/20.5 |
| 3,392,897 A | * | 7/1968 | Siegel | 228/20.5 |
| 3,443,733 A | | 5/1969 | Parente | |
| 3,818,539 A | * | 6/1974 | Fortune | 15/341 |
| 3,884,409 A | * | 5/1975 | Kaufman | 228/20.5 |
| 4,187,972 A | * | 2/1980 | Vella | 228/20.5 |
| 4,206,864 A | | 6/1980 | Rauchwerger | |
| 4,269,343 A | * | 5/1981 | Siegel et al. | 228/20.5 |
| 4,439,667 A | * | 3/1984 | Sylvia | 219/230 |
| 4,773,582 A | * | 9/1988 | Vella | 228/20.5 |
| 4,779,786 A | * | 10/1988 | Holdway | 228/20.5 |
| 5,007,574 A | | 4/1991 | Carlomago et al. | |
| 5,395,046 A | * | 3/1995 | Knobbe et al. | 239/3 |
| 6,186,387 B1 | | 2/2001 | Lawrence et al. | |
| 6,237,831 B1 | | 5/2001 | Lawrence et al. | |
| 6,237,931 B1 | | 5/2001 | Marola | |

FOREIGN PATENT DOCUMENTS

EP 1044751 10/2000

* cited by examiner

Primary Examiner—Kiley Stoner
(74) Attorney, Agent, or Firm—Squire Sanders & Dempsey, LLP

(57) ABSTRACT

This invention provides a system capable of melting solder and removing the melted solder from a substrate. The heating system includes a desoldering tool having at least two handles, a first handle and a second handle. This way, an operator may grip the first handle or the second handle depending on the operator's preference of gripping the desoldering tool. The first handle has a cavity adapted to releaseably receive a storage where the melted solder can be deposited and stored. The storage may have a divot adapted to receive a key from the first handle so that the storage may be orientated in a predetermined position relative to the cavity. The cavity in the first handle is exposed so that the storage can be readily inserted or replaced. This allows the operator to easily replace and maintain the desoldering tool without a significant downtime. The first handle is adapted to receive a heater cartridge having a transition section to couple the leading section and the electrical cartridge in a staggered manner. This configuration allows the leading section to have a shortened channel that is substantially straight and aligned with the passage formed within the first handle to minimize the resistant to flow of the melted solder through the channel which is then deposited into the storage.

63 Claims, 11 Drawing Sheets

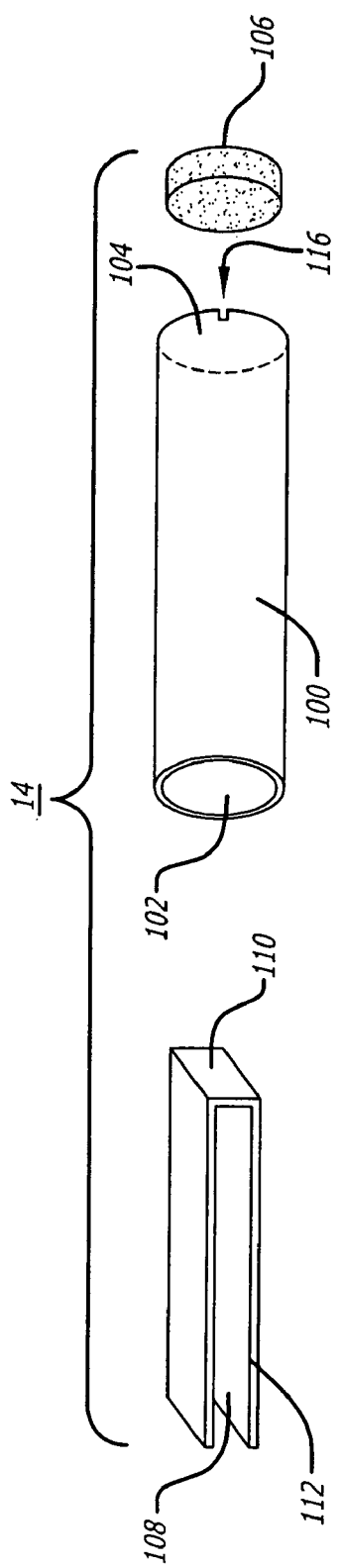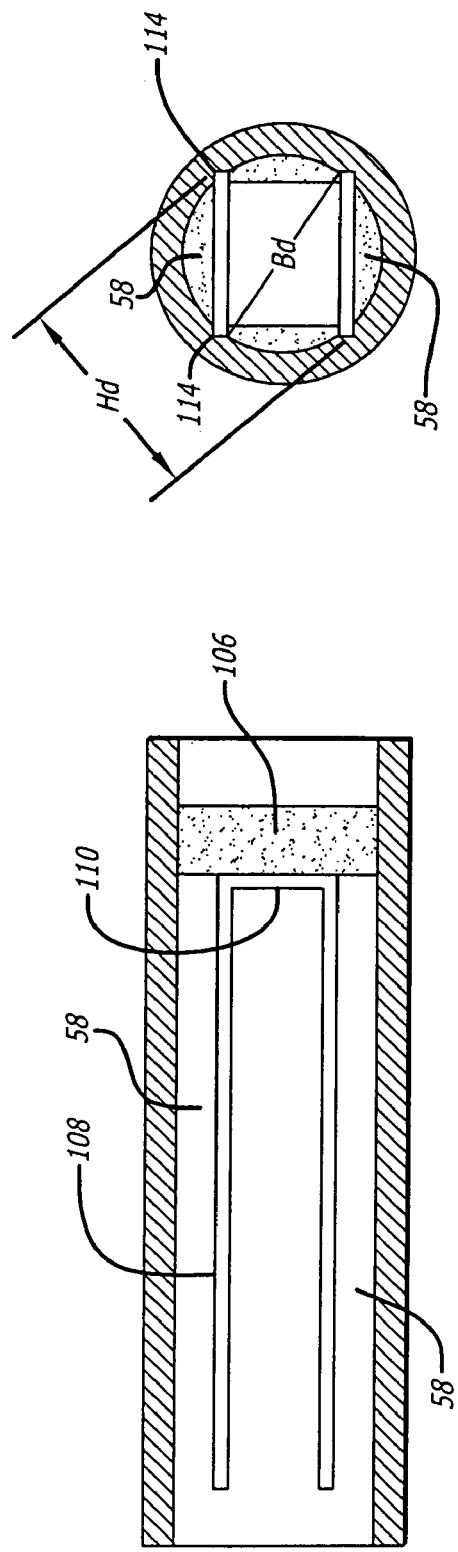

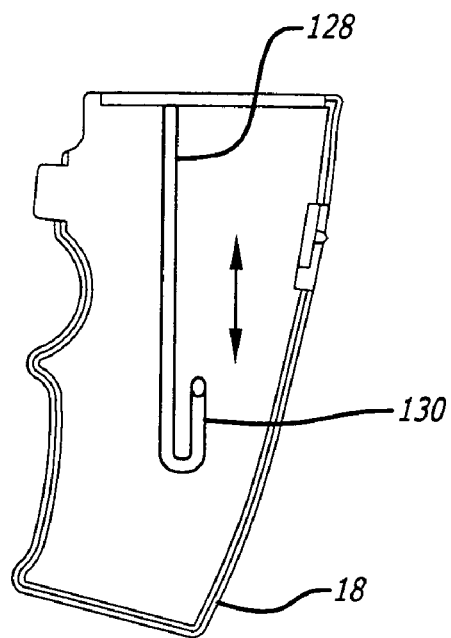
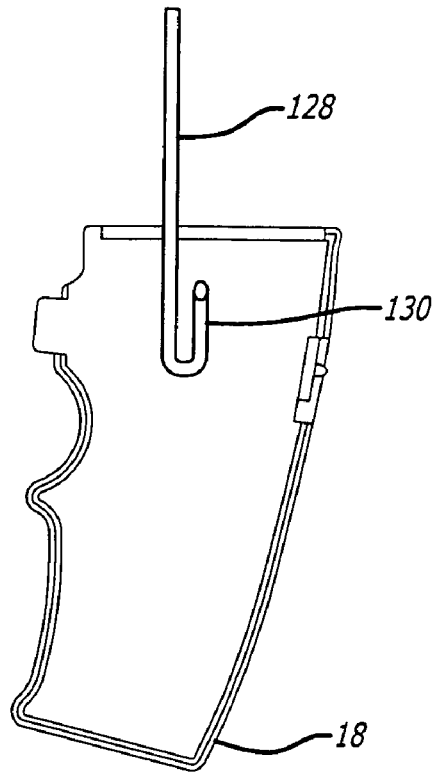
FIG. 18A    FIG. 18B
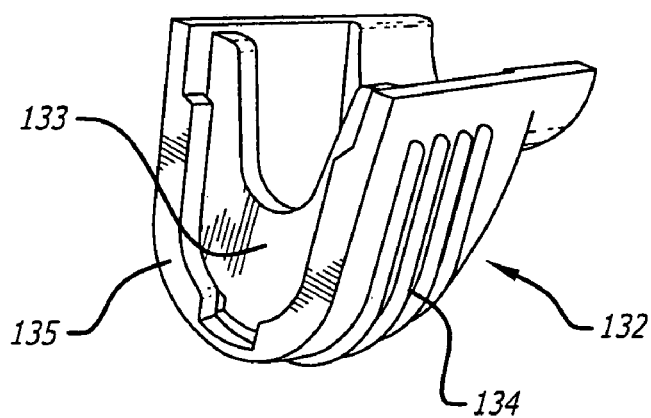
FIG. 19

SOLDER HEATING SYSTEM

BACKGROUND OF THE INVENTION

1. Field of the Invention

This invention is directed to a heating system for removing solder from a substrate such as a circuit board. In particular, the heating system is directed to a desoldering tool that provides a tip for melting solder and retrieving the melted solder to a replaceable storage for retaining the solder and providing operators with different options in gripping the desoldering tool.

2. General Background and State of the Art

Desoldering tools provide heat and vacuum source to a tip in order to melt the solder on a substrate and retrieve the melted solder through the tip. Internally, the desoldering tool has a solder collection chamber where the melted solder is deposited for temporary storage. In addition, the solder collection chamber is provided with a filter to remove the flux from the vapor that accompanies the melted solder so that filtered vapor may be vacuumed away to the vacuum source without clogging the internal mechanism of the desoldering tool. As the melted solder quickly fills the solder collection chamber, the passage to the vacuum source can clog up. This can shorten the desoldering operation and require frequent cleaning or changing of the solder collection chamber. In addition, the solder collection chamber may be integrated into the desoldering tool in such a way that the desoldering tool may need to be disassembled in order to replace or clean the solder collection chamber. This adds to the downtime of the desoldering operation and increases the chance that the desoldering tool is reassembled improperly. The frequent exchange or cleaning of the solder collection chamber also adds to the cost of operating the desoldering tool because of the expense associated with the solder collection chamber.

The desoldering tools are also provided with one grip handle so that operators are limited in the way they can grip the desoldering tools. For example, some soldering tools are provided with a pistol grip while other soldering tools are provided with an elongated housing with a grip on one end. Operators, however, may find that one type of a grip may be more ergonomically comfortable than others. In a large production facility where one type of a grip is provided, some operators may find that the grip is comfortable while many others may find that the same grip is uncomfortable. As such, there still is a need for an improved desoldering tool to efficiently clean or replace the solder collection chamber and provide a grip that is ergonomically comfortable to a variety of operators.

INVENTION SUMMARY

This invention provides a heating system capable of melting solder and removing the melted solder away from a substrate. The heating system includes a desoldering tool having at least a first handle and a second handle. Dividing the desoldering tool into two handles allows an operator to use the desoldering tool in two ways. One way is to operate the first handle independently without the second handle. Another way is to couple the second handle tangentially to the first handle so that an operator can grip the second handle like a pistol. The desoldering tool offers two ways to grip the tool so that operator can grip the first handle or the second handle depending on the operator's preference.

The first handle has a front end and a back end. Along the front end, the first handle is adapted to receive a heater cartridge. The heater cartridge has a leading section with a tip with a channel within the leading section to convey the vacuum source to the tip. In the back end, the first handle receives a power source and a vacuum source, where the power is transmitted to a heater, adjacent to the tip, to convert the power to heat in order to heat the tip. A passage between the vacuum source and the front end of the first handle conveys the vacuum source to the channel within the leading section. This allows the tip to heat the solder and retrieve the melted solder with the vacuum source provided through the channel formed within the leading section. To minimize the resistance to flow of the melted solder, the length of the channel may be minimized and the channel may be substantially straight. In addition, the temperature along the channel may be substantially constant.

To operate the desoldering tool, the first handle may have a first trigger and the second handle may have a second trigger. When only the first handle is used, the first trigger may be used to turn on or off the vacuum source to the tip. When the second handle is used, the second handle may be tangentially coupled to the first handle in such a way that the second trigger is mechanically coupled to the first trigger so that actuation of the second trigger activates the first trigger, which in turn turns on or off the vacuum source to the tip. As such, the first handle may be used independently as a desoldering tool, depending on the working environment and the operator's preference. Optionally, the second handle may be coupled to the underside of the first handle to turn on or off the desoldering tool using the second trigger located on the second handle.

Once the desoldering tool is in operation, the power to the heater may be provided while actuation of the first trigger or the second trigger may turn on or off the vacuum source to the tip. That is, the power provided to the heater may be monitored independently from the operation of the vacuum source so that the heater may provide sufficient heat to the channel to maintain the solder in a melted state so that the solder may flow through the channel.

The first handle may have a cavity adapted to releaseably receive a storage, where the melted solder through the channel can be deposited and stored. The storage may include a filter to capture the dust or vapors from the melted solder that may clog up the passage to the vacuum source in the first handle. The storage may have a divot adapted to receive a key from the first handle so that the storage may be orientated in a predetermined position relative to the cavity. The cavity in the first handle is exposed so that the storage can be readily inserted or replaced. This allows the operator to easily replace and maintain the desoldering tool without significant downtime.

Besides the leading section, the heater cartridge may have an electrical cartridge that couples to the power source to provide power to the heater adjacent to the tip. The heater cartridge has a transition section to couple the leading section to the electrical cartridge so that the longitudinal axis of the leading section is staggered with the longitudinal axis of the electrical cartridge. Such configuration allows the leading section to have a shortened channel that is substantially straight and aligned with the passage formed within the first handle to minimize the resistance to flow of the melted solder and provide an efficient path for the vacuum source. The diameter of the channel may be greater away from the tip to minimize the resistance to flow of the melted solder. In addition, the heater and the leading section may be integrated by bonding the two with ceramic material. This is done to block out air gaps to improve the conduction path from the heater to the tip of the leading section. By improving the conduction or heat transfer from the heater to the tip, the leading section may have a better thermal recovery to rapidly heat the leading tip and the channel.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood with reference to the following figures. The components in the figures are not necessarily to scale, emphasis instead being placed upon illustrating the principles of the invention. Moreover, in the figures, like reference numerals designate corresponding parts throughout the different views.

FIG. 6 is an exploded view of the storage of the system of FIG. 1.

FIG. 7 is a cross-sectional view of the storage.

FIG. 8 is a front view of the storage.

FIG. 18A is a cross-sectional view of the second handle with a pin in the retracted position.

FIG. 18B is a cross-sectional view of the second handle with the pin in a protracted position.

FIG. 19 is perspective view of a heater cartridge remover of the present invention.

DETAILED DESCRIPTION OF THE PREFERRED EMBODIMENTS

Figure 1:
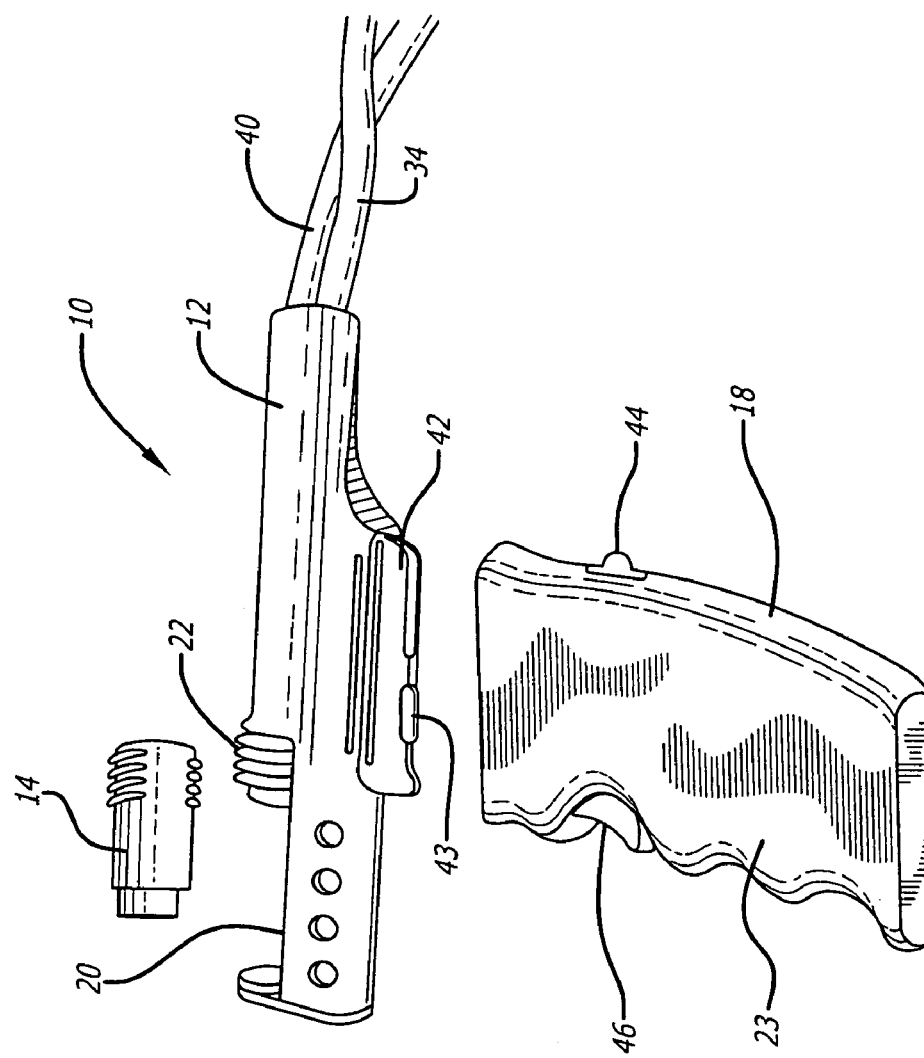
FIG. 1 is an exploded perspective view of a heating system of the present invention.

FIG. 1 illustrates a heating system show generally at 10 including a first handle 12 adapted to releaseably couple to a storage 14, a heater cartridge 16, and a second handle 18. The first handle 12 has a cavity 20 that may be formed near the heater cartridge 16. To engage the storage 14 within the cavity 20, the first handle 12 may have a back holder 22 that may move between a first position and a second position. In the first position, the length of the cavity 20 may be longer than the length of the storage 14 along the longitudinal direction of the first handle 12; whereas in the second position, the length of the cavity 20 may be similar or slightly less than the length of the storage 14. As such, when the back holder 22 is in the first position, the storage 14 may be inserted or removed from the cavity 20. To engage the storage 14 within the cavity 20, the back holder 22 may be moved from the first position to the second position so that the storage 14 may be held within the cavity 20.

Figure 2:
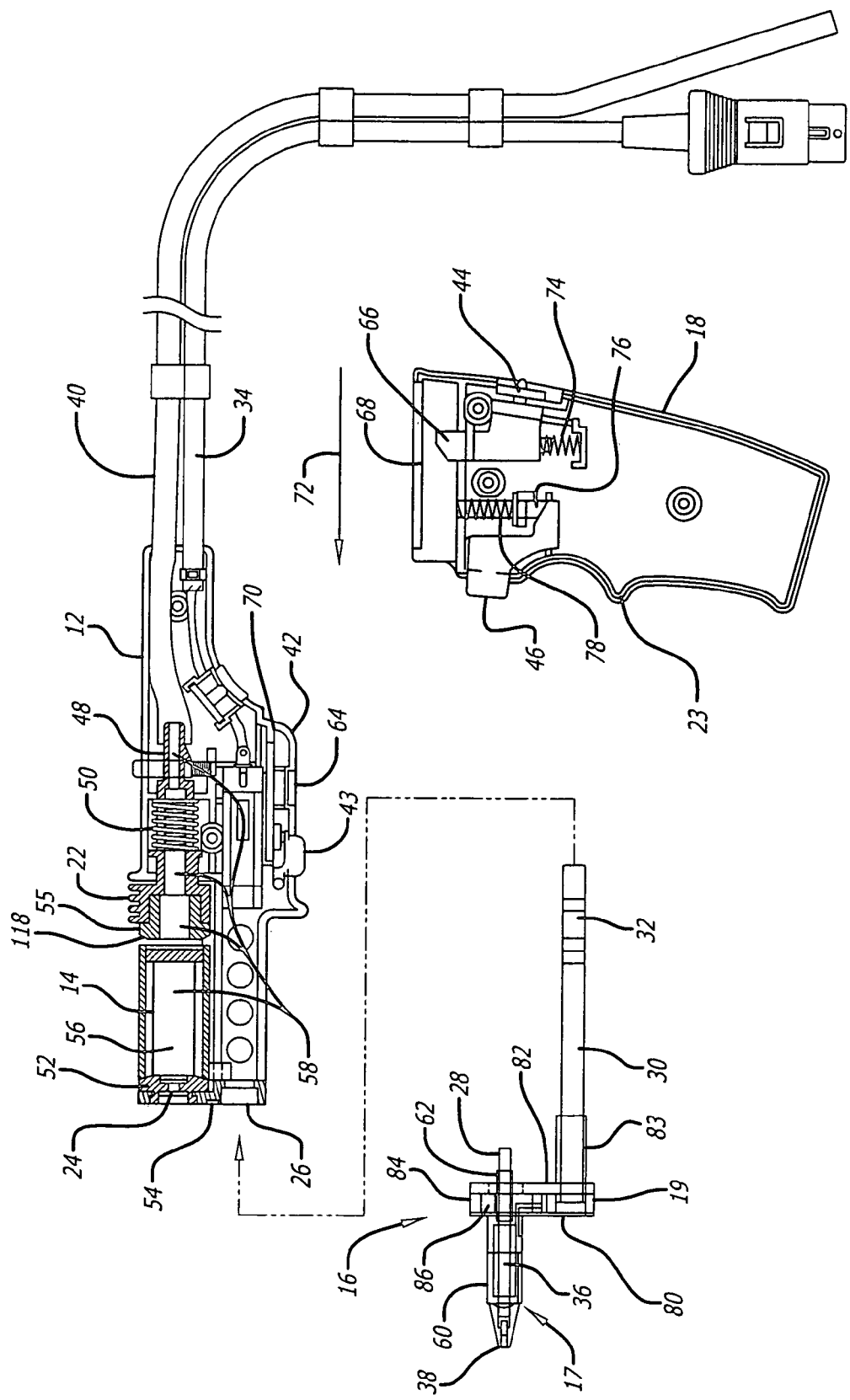
FIG. 2 illustrates a cross-sectional view of the heating system of FIG. 1.

As illustrated in FIG. 2, the first handle 12 has a first opening 24 and a second opening 26 adapted to receive the pipe 28 and the electrical cartridge 30 from the heater cartridge 16, respectively. The electrical cartridge 30 has a contact end 32 that is adapted to electrically couple to the power line 34 provided to the first handle 12. The heater cartridge 16 has a channel 36 formed between the tip 38 and the pipe 28. Once the heater cartridge 16 and the storage 14 are assembled with the first handle 12, the vacuum source 40 is connected to the channel 36 such that the vacuum may be provided at the tip 38.

The first handle 12 may also have an engagement member 42 adapted to releaseably couple to the second handle 18. The heating system 10 may be used or without the second handle 18 depending on the operator's preference. Once the desoldering tool is in operation, the power from the power line 34 may be provided to the heater cartridge 16 for heating the solder. The first handle 12 may have a first trigger 43 that may be activated and deactivated to turn on or off the vacuum source, respectively, to the tip of the heater cartridge 16. The second handle 18 may be releaseably coupled to the first handle 12 through the engagement member 42 as illustrated in FIG. 2. The second handle 18 may be tangentially coupled to the first handle 12 so that the second handle may be gripped like a pistol. The second handle 18 may be releaseably coupled to the first handle in a variety of orientations to allow for comfortable grip to an operator. The second handle 18 may have a lock 66 that engages with the receptor 64 formed within the first handle 12 to lock the first handle 12 and the second handle 18 together. The second handle may be provided with a second trigger 46 that is mechanically coupled to the first trigger 43 such that when the second trigger 46 is activated, the first trigger 43 is activated as well. In other words, the second handle 18 may have a grip area 23 with the second trigger 46 so that a user may grip the heating system 10 like a pistol by gripping around the grip area 23 of the second handle 18. In this way, a user may operate the first handle 12 independently as a desoldering tool by gripping the first handle 12 like a pencil, for example. Alternatively, the user may attach the second handle 18 to the underside of the first handle 12 to grip the grip area 23 of second handle 18 to hold the heating system 10 like a pistol depending on the user's preference. With the second handle 18 attached to the first handle 12, the user may activate the second trigger 46 which in turn activates the first trigger 43 to provide the vacuum source to the tip 38 of the heater cartridge 16.

The back holder 22 may have an outlet 48 that is coupled to the vacuum source 40. The back holder 22 may be biased against a resistant member 50 to allow the back holder 22 to move between the first position and the second position. FIG. 2 illustrates the back holder in the first position to allow the storage 14 to be inserted or removed from the cavity 20. The storage 14 may be held between a first seal member 52 and a second seal member 55. The first seal member 52 may be releaseably coupled to the front end 54 of the first handle 12. The second seal member 55 may be releaseably coupled to the back holder 22. Once the pipe 28 and the electrical cartridge 30 are inserted into the first opening 24 and the second opening 26, respectively, the pipe 28 protrudes into the storage space 56. A passage 58 may be formed along the storage space 56, the second seal member 55, back holder 22, and so that the vacuum created along the outlet 48 may be conveyed to the tip 38 through the channel 36.

The channel 36 formed between the tip 38 and the pipe 28 may be substantially straight to minimize the resistance to flow of the melted solder through the channel 36. The temperature along the channel 36 may be maintained above the melting temperature of the solder to maintain the solder in a melted state. This way, melted solder removed through the channel 36 remains in the melted state as it flows from the tip 38 through the end of the pipe 28. For instance, a portion of the pipe 28 may be surrounded by a heater 60 to conduct heat to the tip 38 to melt the solder to a liquid state and retrieve the melted solder through the channel 36 within the tip. The temperature along a portion of the channel 36 that is away from the heater 60 may be lower than the portion of the channel 36 that is closer to the heater 60. To maintain the solder in the melted state along the entire length of the channel 36, a portion of the pipe 28 that is away from the heater 60 may be covered with a conducting material 62 to conduct heat from the heater 60 to the portion of channel 36 that is away from the heater 60. This way, the temperature along the channel 36 is maintained above a pre-determined temperature to maintain the solder in a melted state to remove the solder through the end of the pipe 28 and deposited into the storage space 56. For example, the pipe 28 near the front end 54 of the first handle 12 may be surrounded by a bronze material to transfer the heat from the heater 60 to the portion of the pipe 28 that is away from the heater 60.

FIG. 2 illustrates that the channel 36 formed along the heater 60 and pipe 28 may be larger than the channel formed near the tip 38. This may be provided to minimize the resistance to flow of solder through the pipe 28 and to provide a greater flow rate through the channel 36 formed within the tip 38. To further minimize the resistance to flow of solder, the distance between the tip 38 and the end of the pipe 28 may be minimized. Accordingly, a combination of having a substantially constant temperature along the channel 36 that is short and straight provides for an efficient heater cartridge 16 that removes the melted solder from the tip 38 to the end of the pipe 28. To shorten the length of the channel 36 and maintain it substantially straight, the heater cartridge 16 may have a staggered configuration as discussed below. In addition to having a substantially straight channel 36, the passage 58 formed along the storage space 56, the second seal member 55 and the back holder 22 may be substantially straight as well to minimize the resistance to the vacuum source between the outlet 48 and the storage space 56. As the heater cartridge 16 wears out, it may be replaced. Optionally, just the tip 38 may be replaceable so that the heater 60 and the electrical cartridge 30 may be reused.

FIG. 2 illustrates that the heater cartridge 16 may include a leading section 17 coupled to a transition section 19. The electrical cartridge 30 is also coupled to the transition section 19 but the electrical cartridge 30 may be off-set with respect to the leading section 17. Accordingly, the heater cartridge 16 may have a leading section 17 that is staggered with respect to the electrical cartridge 30. Such configuration allows the channel 36 to be substantially straight and aligned with the passage 58 formed within the first handle 12 to minimize the resistance to providing vacuum from the vacuum source 40 to the channel 36. Such configuration also reduces the distance between the tip 38 and the pipe 28, and provides for a channel 36 that is substantially straight. The electrical cartridge 30 may be detectable from the transition section 19 so that the electrical cartridge 30 may be replaceable. The first and second seal members 52 and 55 may be releaseably coupled to the first handle 12 such that they too may be replaceable. Optionally, as the leading section 17 wears out, it may be removed from the transition section 19 and replaced with a new leading section.

FIG. 2 illustrates that the first handle 12 may be utilized with or without the second handle 18. The engagement member 42 may have a receptor 64 adapted to receive a locking member 66 from the second handle 18. The second handle 18 may further include a hook 68 adapted to slide into a slot 70 formed within the engagement member 42. To releaseably couple the second handle 18 to the first handle 12, the hook 68 may be slid into the slot 70 as indicated by the direction arrow 72. Once the second handle 18 is fully inserted into the engagement member 42, the locking member 66 engages into the receptor 64 thereby locking the second handle 18 to the first handle 12. The locking member 66 may be biased against a resisting member 74 to allow the locking member 66 to move between an engagement position and a releasable position. The locking member 66 may be coupled to a switch 44 to move the locking member 66 between the engagement position and the releasable position. The second trigger 46 may be coupled to a rod 76 which is biased by the resisting member 78. Once the second handle 18 is fully engaged with the engagement member 42, the free end of the rod 76 may be positioned against the first trigger 43 of the first handle 12. As such, the actuation of the second trigger 46 causes the first trigger 43 to actuate thereby providing vacuum source to the tip 38. To release the second handle 18 from the first handle 12, the switch 44 may be lowered thereby disengaging the locking member 66 from the receptor 64 to allow the second handle 18 to move in the opposite direction of the direction arrow 72. Once the hook 68 is disengaged with the engagement member 42, the second handle 18 may be disengaged from the first handle 12.

Figure 3:
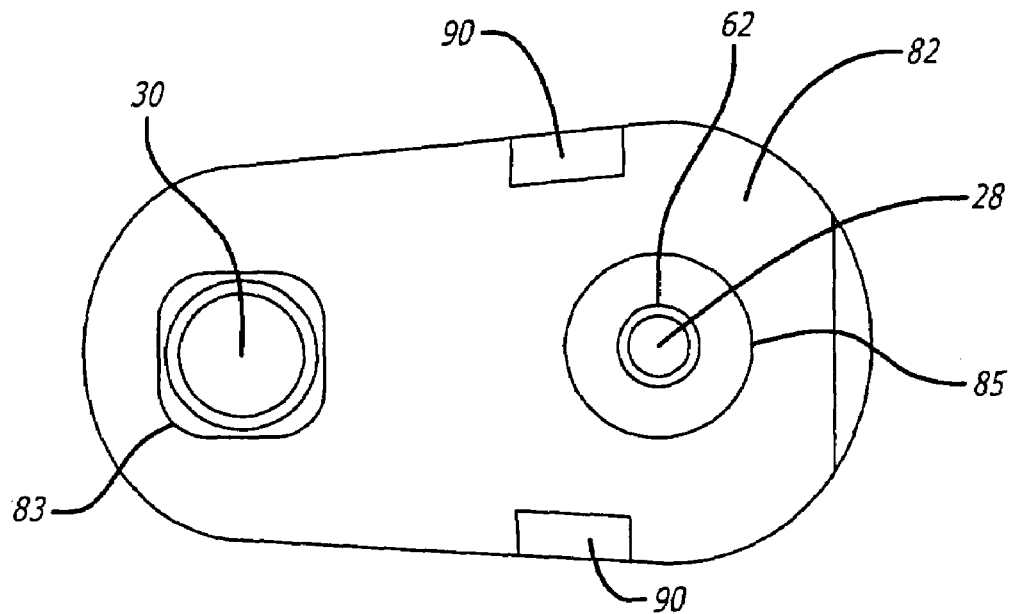
FIG. 3 is an enlarged view of the backside of the heater cartridge of the system of FIG. 1.
Figure 4:
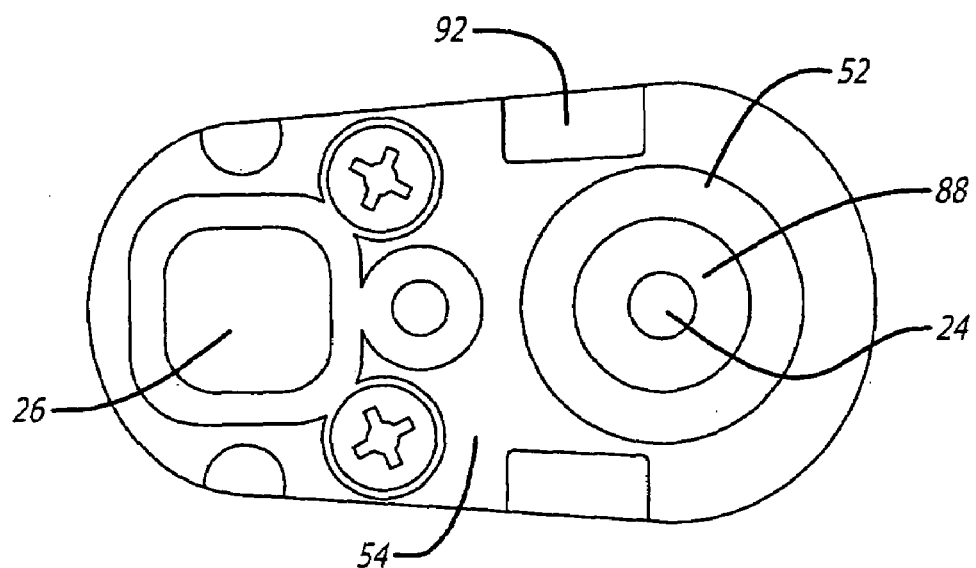
FIG. 4 is an enlarged view of the front end of the first handle of the system of FIG. 1.

FIG. 2 illustrates that the transition section 19 may be comprised of a first plate 80 and a second plate 82 with spacers 84 between the two plates to provide a gap 86 between the two plates. The gap 86 may be provided to insulate the second plate 82 from the thermal heat provided by the heater 60. In addition, electrical conductor wires from the electrical cartridge 30 may be fed through the gap 86 and coupled to the appropriate leads in the leading section 17. The first plate 80 may be a metal piece capable of withstanding high temperature. The second plate 82 may be formed from a plastic material capable of withstanding high temperature as well. The second plate 82 may have a sleeve 83 adapted to receive the electrical cartridge 30. The sleeve 83 may extend further than the pipe 28 so that as the electrical cartridge 30 is inserted into the second opening 26, the sleeve 83 may contact the second opening 26 before the pipe 28 made its contact with the first opening 24. The sleeve 83 and the second opening 26 may have a predetermined configuration so that as the sleeve 83 is inserted into the second opening 26, the sleeve 83 orientates the heater cartridge 16 relative to the first handle 12. With the sleeve 83 orientating the heater cartridge 16, the pipe 28 may be orientated with the first opening 24 as well so that pipe 28 may be inserted into the first opening 24 with minimal resistance or without damaging the first seal 52. For instance, the sleeve 83 and the second opening 26 may have a square, oval, rectangular, or like configuration so that as the sleeve 83 is inserted into the second opening 26, the sleeve 83 orientates the heater cartridge 12 relative to the first handle 12. FIGS. 3 and 4 illustrate the sleeve 83 and the second opening 26 having a square outer configuration to orientate the heater cartridge 16.

FIG. 3 illustrates the back side of the second plate 82 with the pipe 28 protruding through an opening 85 formed within the second plate 82. In addition, the conducting material 62 may surround at least a portion of the pipe 28 that protrudes through the opening 85 as well. A space may be provided between the conducting material 62 and the opening 85 to minimize damage that may be caused due to excessive heat from the conducting material 62 to the second plate 82. FIG. 3 illustrates the electrical cartridge 30 protruding from the second plate 82 as well. The second plate 82 may further include teeth 90 adapted to engage with the front end 54 of the first handle 12 as described below.

FIG. 4 illustrates the front end 54 having a first opening 24 and a second opening 26. The first opening 24 may be formed within the first seal member 52. The seal member 52 may also have a depression 88 adapted to receive the conducting material 62 with a gap to minimize the heat transfer from the conducting material 62 to the first seal member 52. The front end 54 may also include notches 92 adapted to receive the teeth 90 protruding from the second plate 82.

Figures 5A, 5B:
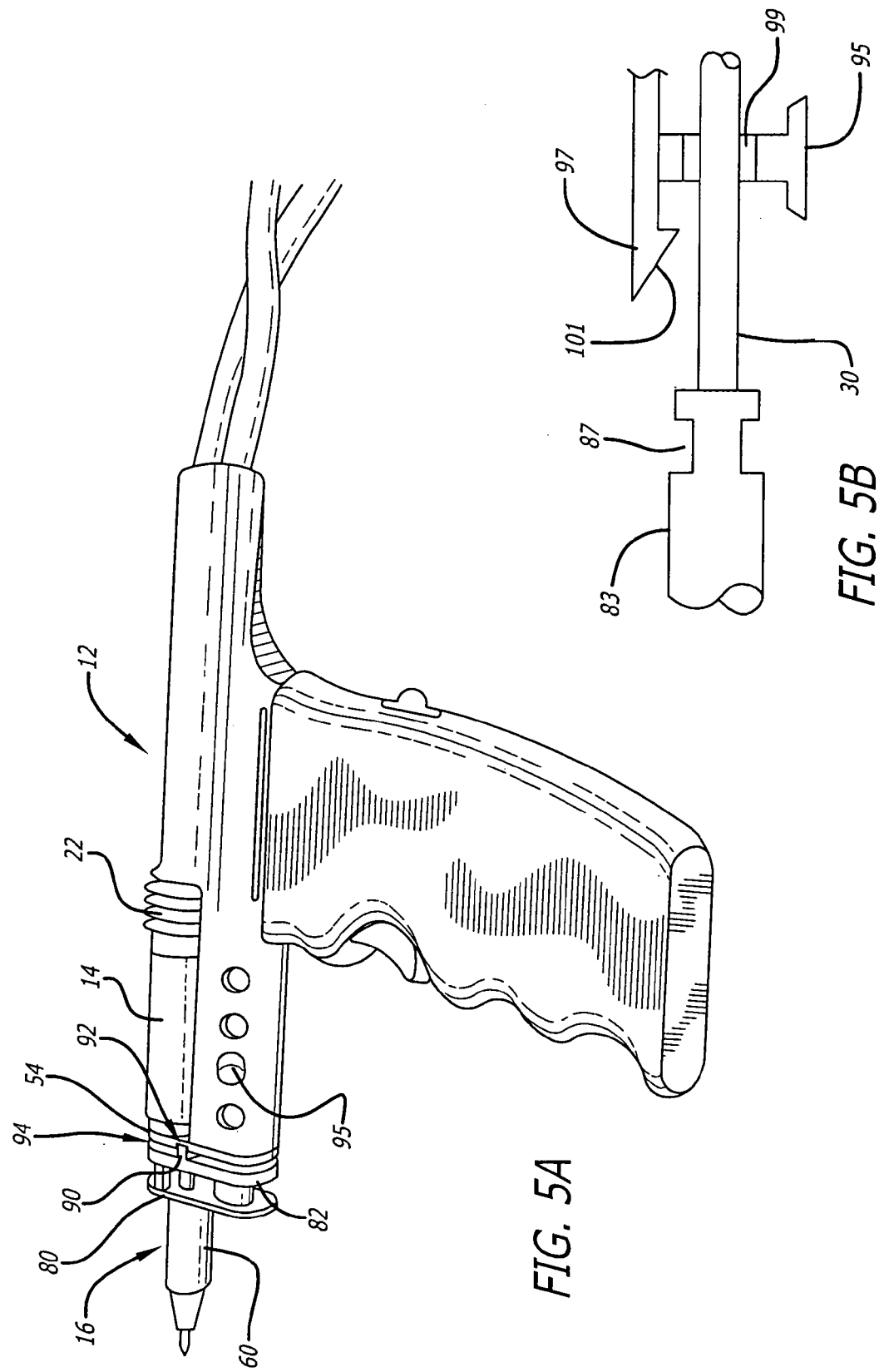
FIG. 5A is a perspective view of the heating system with the heater cartridge, storage, the first handle, and the second handle releaseably coupled to one another.
FIG. 5B illustrates an internal locking mechanism within the heating system.

FIG. 5A illustrates the pipe end 28 and the electrical cartridge 30 fully inserted into the first and second openings 24 and 26, respectively. In addition, the storage 14 is engaged within the cavity 20 by the back holder 22 in the second position. As the heater cartridge 16 is inserted into the first handle 12, the teeth 90 engage with the notches 92 to align the heater cartridge 16 with respect to the first handle 12 along with the sleeve 83 and the second opening 26 as discussed above. The teeth 90 may butt against the notches 92 to form a second gap 94 between the second plate 82 and the front end 54 to further insulate the front end 54 from the thermal heat from the heater 60.

FIG. 5A also illustrates the first handle 12 having a button 95 that releases the heater cartridge 16 once the heater cartridge 16 is engaged with the first handle 12. FIG. 5B illustrates an internal mechanism to hold the heater cartridge once the sleeve 83 is inserted into the second opening 26 of the first handle 12. The button 95 extends from a hinge 97 with a large opening 99 adapted to receive the electrical cartridge 30. The large opening 99 is sufficiently large so that the button 95 may be pushed perpendicularly relative to a longitudinal axis of the electrical cartridge. The button 95 may be pushed which in turn causes the hinge 97 to move away from the electrical cartridge. The sleeve 83 has a cavity 87 adapted to receive the hook 101 of the hinge 97 so that once the hook 101 is engaged with the sleeve 83, the heater cartridge 16 is prevented from being pulled away from the first handle 12. To release the heater cartridge 16, the button 95 may be pushed thereby causing the hook 101 to release the sleeve 83 so that the heater cartridge may be pulled away from the first handle. Such mechanism ensures that the heater cartridge 16 does not pull away from the first handle unintentionally.

FIG. 6 illustrates an exploded view of the storage 14. The storage 14 may include a housing 100 having a first end 102 and a second end 104 with an opening between the two ends. The housing 100 may be adapted to receive a filter 106 within the second end 104. The housing 100 may further receive a radiating member 108 so that the radiating member 108 and the filter 106 may be adjacent to one another. The radiating member 108 may have a U-shape configuration with a base 110 and a pair of legs 112 extending therefrom. The pair of legs 112 may be substantially planar so that once the melted solder comes into contact with any one of the legs 112 and the base 110, they may conduct heat away from the melted solder to cool and solidify the solder onto the radiating member 108. This way, the melted solder may be retained and stored within the storage 14. In addition, the housing 100 may be made of transparent material so that the operator may visually detect whether the storage is full of solder or not. In terms of material, the housing, radiating member, and the filter may be made of a variety of materials. For instance, the housing may be made of paper, plastic, transparent plastic, glass, metal, etc. The radiating member may be made of aluminum, steel, and the like.

FIG. 7 illustrates a cross-sectional view of the storage 14 illustrating that the base 110 of the radiating member 108 may be flush against the filter 106. The radiating member 108 may be formed from a thin strip of a material and bent ninety degrees in two corners with respect to the base 110 to form the U-shape radiating member 108. Depending on the length of the two legs 112, the base 110 may be flush against the filter 106 or a gap may be formed. Having a gap between the base 110 and the filter 106 may provide additional passage for the vacuum provided through the vacuum source 40 to be provided at the tip 38. In other words, having a gap between the base 110 and the filter 106 may minimize the resistance to flow of solder into the radiating member 108. Even without a gap, however, the outer areas along the filter 106, not against the base 110, may provide sufficient passage to vacuum the solder through the tip and into the radiating member 108.

FIG. 8 illustrates the front view of the storage 14 with the filter 106 fitted into the second end 104 of the housing 100 and the radiating member 108 inserted into the housing 100 with the base 110 being adjacent to the filter 106. The base 110 of the radiating member 108 may have a diagonal distance Bd that is substantially similar or slightly less than the inner diameter Hd of the housing 100. As such, the radiating member 108 may fit snugly into the housing 100. With the snug fit between the radiating member 108 and the housing 100, the passages 58 are formed along the longitude direction of the housing 100 as illustrated in FIGS. 7 and 8. The passages 58 ensure that the vacuum created in the outlet 48 may be also provided at the tip 38 through the passages 58 within the storage 14.

Figure 17:
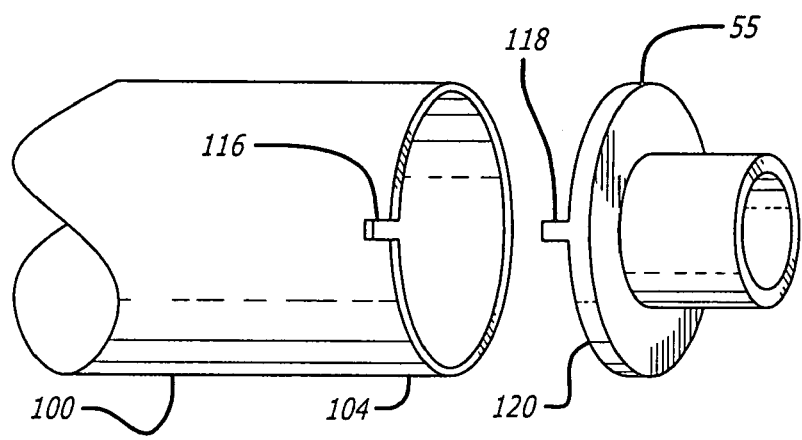
FIG. 17 is a perspective view of the storage and the second seal member having a divot and a key, respectively.

FIG. 8 illustrates that cutouts 114 may be formed within the inner surface of the housing 100 so that the radiating member 108 may be inserted into the housing 100 in a predetermined orientation. In addition, as illustrated in FIG. 6, the second end 104 of the housing 100 may have a divot 116 adapted to receive a key 118 (as illustrated in FIG. 17) protruding from the second seal member 55. The combination of the key 118 and the divot 116 allows the storage 14 to be inserted into the cavity 20 in a predetermined position or orientation relative to the cavity 20. Accordingly, the combination of the cutouts 114 within the inner surface of the housing 100 and the divot 116 on the housing 100 may ensure that when the storage 14 is inserted into the cavity 20, the pair of legs 112 are oriented in a predetermined direction so that the melted solder passing through the pipe 28 may generally fall on one of the legs.

Figure 9:
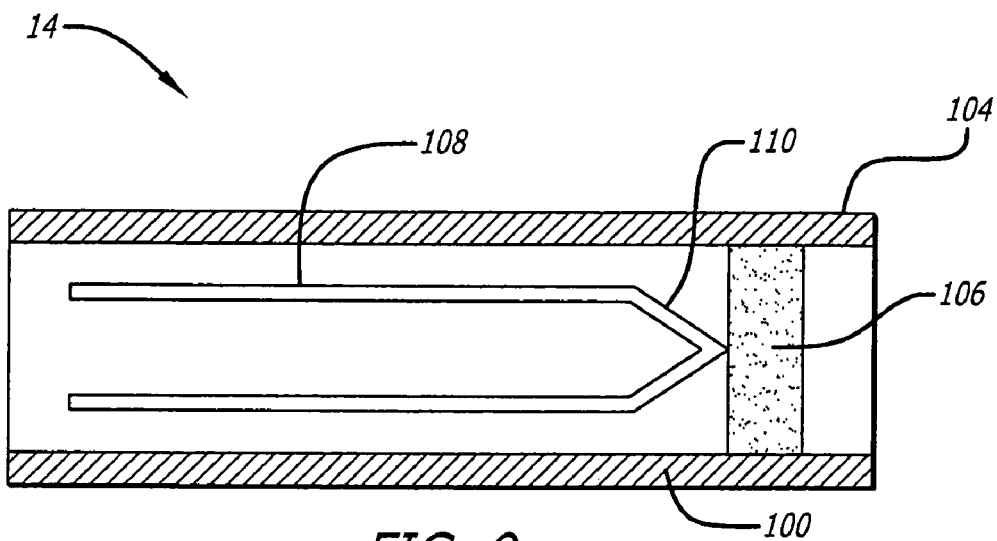
FIG. 9 is a cross-sectional view of the storage where the radiating member thereof has a V-shaped base.
Figure 10:
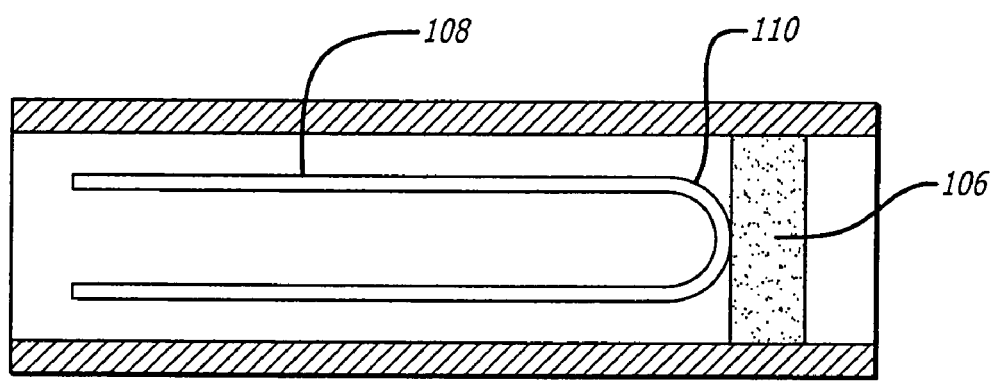
FIG. 10 is a cross-sectional view of the storage where the radiating member has a U-shaped base.
Figure 11:
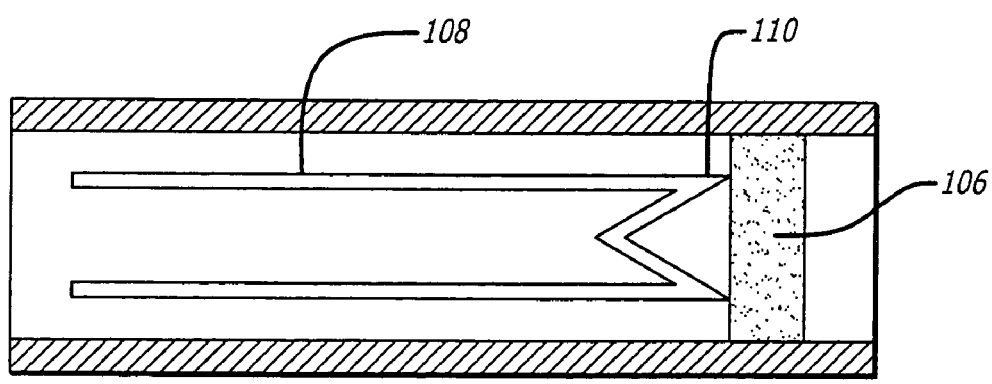
FIG. 11 is a cross-sectional view of the storage where the radiating member has a W-shaped base.
Figure 12:
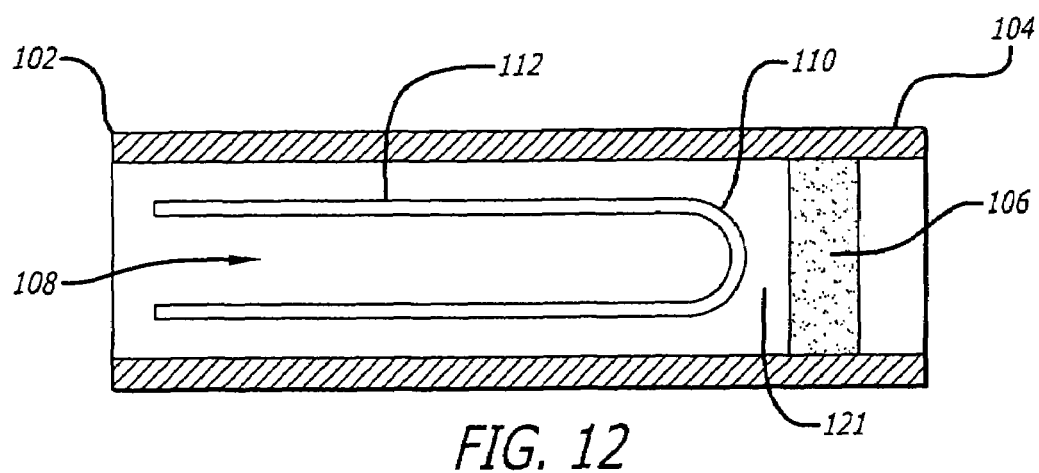
FIG. 12 is a cross-sectional view of the storage where the radiating member has a U-shaped base with a gap between the base and the filter.
Figure 13:
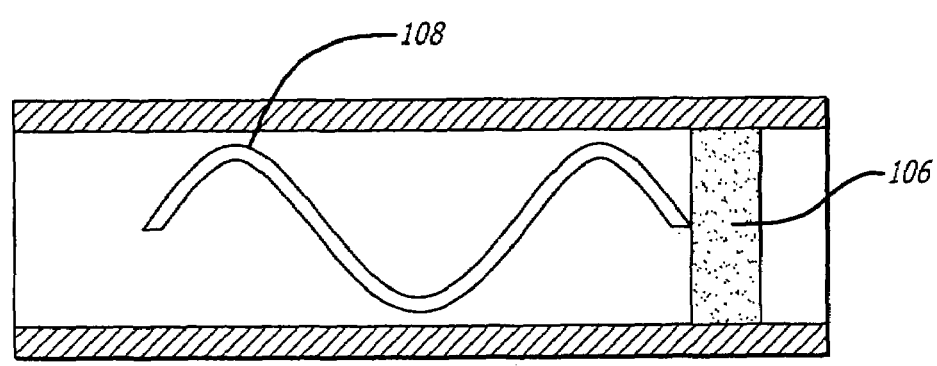
FIG. 13 is a cross-sectional view of the storage where the radiating member has a curved configuration.

FIGS. 9 through 13 illustrate a variety of alternative radiating members 108 that may be used within the storage 14 for capturing the melted solder received through the pipe 28. FIG. 9 illustrates that the radiating members 108 may have a base 110 having a V-shaped configuration; FIG. 10 illustrates the base 110 having a U-shape; and FIG. 11 illustrates a base 110 having a W-shaped configuration. The radiating members 108 may be formed from a strip of metal and bent along the base to have a variety of configurations as illustrated in FIG. 7 and FIG. 9 through FIG. 11. With the base 110 having a V, U, or W shaped configuration, as illustrated in FIGS. 9-10, respectively, a substantial portion of the filter surface may be exposed so that vacuum source created on the second end 104 of the housing 100 may be conveyed to the first end 102 of the housing 100. In other words, with a small portion of the base 110 making contact with the filter 106, the resistance to providing vacuum through the filter 106 is minimized. FIG. 12 illustrates that a gap 121 may be formed between the base 110 of the radiating member 108 and the filter 106. The gap 121 provides a clear passage for vapor from the pipe 28 to pass through the filter 106 where it is filtered so that cleaner fume or vapor may pass through the second end 104 of the storage 14. FIG. 13 illustrates a radiating member 108 that is curved like a sine wave so that as the melted solder lands on the radiating member 108, the heat from the melted solder is quickly dissipated through the radiating member 108. The curvature of the radiating member 108 substantially prevents the melted solder from making contact with the filter 106.

Figure 14:
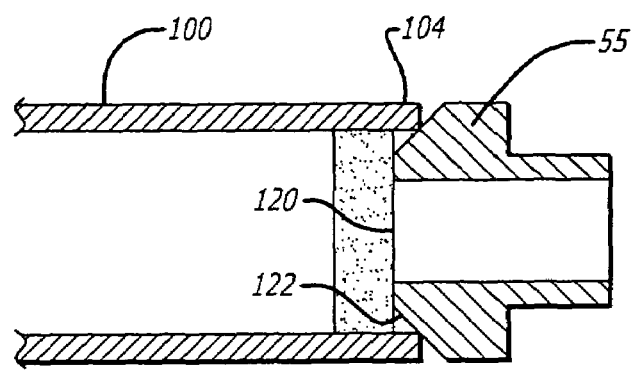
FIG. 14 is a cross-sectional view of the storage associating with the second seal member.
Figure 15:
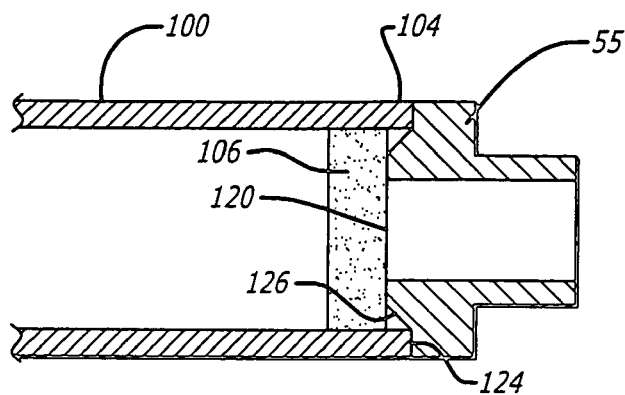
FIG. 15 is a cross-sectional view of the storage with an alternative second seal member.
Figure 16:
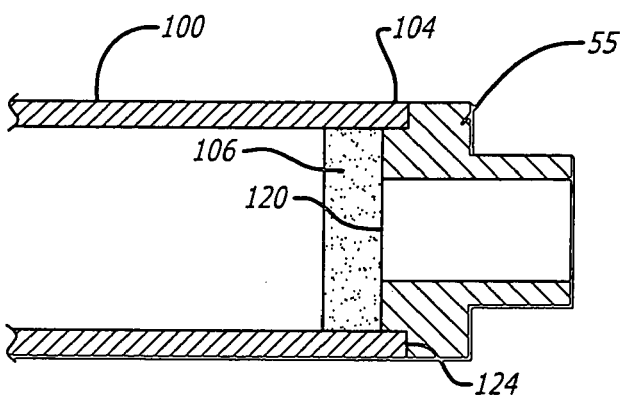
FIG. 16 is a cross-sectional view of the storage associating with yet another second seal member.

FIGS. 14 through 16 illustrate a variety cross-sectional views for the second seal member 55 to close the second end 104 of the housing 100. FIG. 14 illustrates that the enclosing side 120 may have a bevel edge 122 along the outer edge of the second seal member 55 to substantially seal around the outer circumference of the second end 104 of the housing 100. Depending on the slope of the bevel edge 122, the depth to which the enclosing side may engage within the housing 100 may vary. As the resisting member 50 pushes the second seal member 55 against the second end of the housing 100, the enclosing side 120 may engage with the filter 106 which in turn causes the filter to engage or flush with the base 110 of the radiating member 108. As discussed above, however, the pair of legs 112 of the radiating member 108 may be shortened to ensure that a gap may be formed between the base 110 and the filter 106.

FIG. 15 illustrates that the enclosing side 120 may have a step 124 and a bevel 126 along the outer circumference of the second seal member 55. As the resisting member 50 pushes against the second seal member 55, the bevel 126 may be inserted into the second end 104 of the housing 100 such that the bevel edge 126 properly aligns the second seal member 55 with the longitudinal axis of the housing 100. In turn, the second end 104 may properly engage with the step 124 of the seal member 55 to form a seal between the two.

FIG. 16 illustrates the enclosing side 120 of the second seal member 55 having a step 124. Once the second seal member is engaged with the second end 104 of the housing 100, the step 124 and a portion of the enclosing side may engage with the inner wall of the second end 104 to provide a seal between the second seal member 55 and the second end 104 of the housing 100.

FIG. 17 illustrates the second seal member 55 having a key 118 protruding from the sealing side 120. The second end 104 of the housing 100 may have a divot 116 adapted to receive the key 118 so that the second seal member 55 may be properly orientated along the radial direction relative to the housing 100. The combination of the key 118 and the divot 116 may be provided to ensure that the storage 14 is properly orientated within the cavity 20 once the second seal member 55 engages with the second end 104 of the housing 100. The variety of configurations illustrated in FIGS. 14 through 16 may be provided in the first seal member 52 such that the respective enclosing sides may be either symmetrical or non-symmetrical. In addition, the key 118 and the divot 116 combination may be provided on the first seal member 52 and the first end 102 of the housing, respectively.

FIGS. 18A and 18B illustrate that the second handle 18 may have a pin 128 that is adapted to move in and out of the second handle 18. FIG. 18A illustrates the pin 128 in a retracted position, and FIG. 18B illustrates the pin 128 in the extended position. The second handle 18 may be provided with a button 130 that is coupled to the pin 128 such that when the button 130 is moved from the retracted position as shown in FIG. 18A to the protracted position as shown in 18B, the pin 128 protrudes from the second handle 18. The diameter of the pin 128 may be substantially similar or slightly less than the diameter of the channel in the tip 38. As such, with the pin 128 in the protracted position, the pin may be inserted into the channel 36 of the tip 38 to remove the solder that may have solidified within the channel 36. That is, the pin 128 may be used to clean the channel 36 to remove the unwanted solder that may be clogging the channel 36.

FIGS. 19 illustrates a heater cartridge remover 132 adapted to engage with the heater cartridge 16 to remove the heater cartridge from the first handle 12 when the heater cartridge is hot. The heater cartridge remover 132 has a holding wall 133 and a hook 135 with a space therebetween. The holding wall 133 and the hook 135 are configured to associate with the bottom side of the transition section 19 so that the space between the holding wall 133 and the hook 135 may receive the first plate 80 (FIG. 2) of the transition section 19. With the first plate 80 between the holding wall 133 and the hook 135, a user may hold onto a holding portion 134 of the remover 132 to pull the heater cartridge 16 away from the handle 12 or insert the heater cartridge 16 to the handle 12. This way, a user may use the remover 132 to remove the heater cartridge 16 from the handle 12 while it is hot. When the heater cartridge remover 132 is not in use, the heater cartridge remover may be releaseably coupled to the second handle 18 or the first handle 12 so that the heater cartridge remover does not get misplaced.

Figure 20:
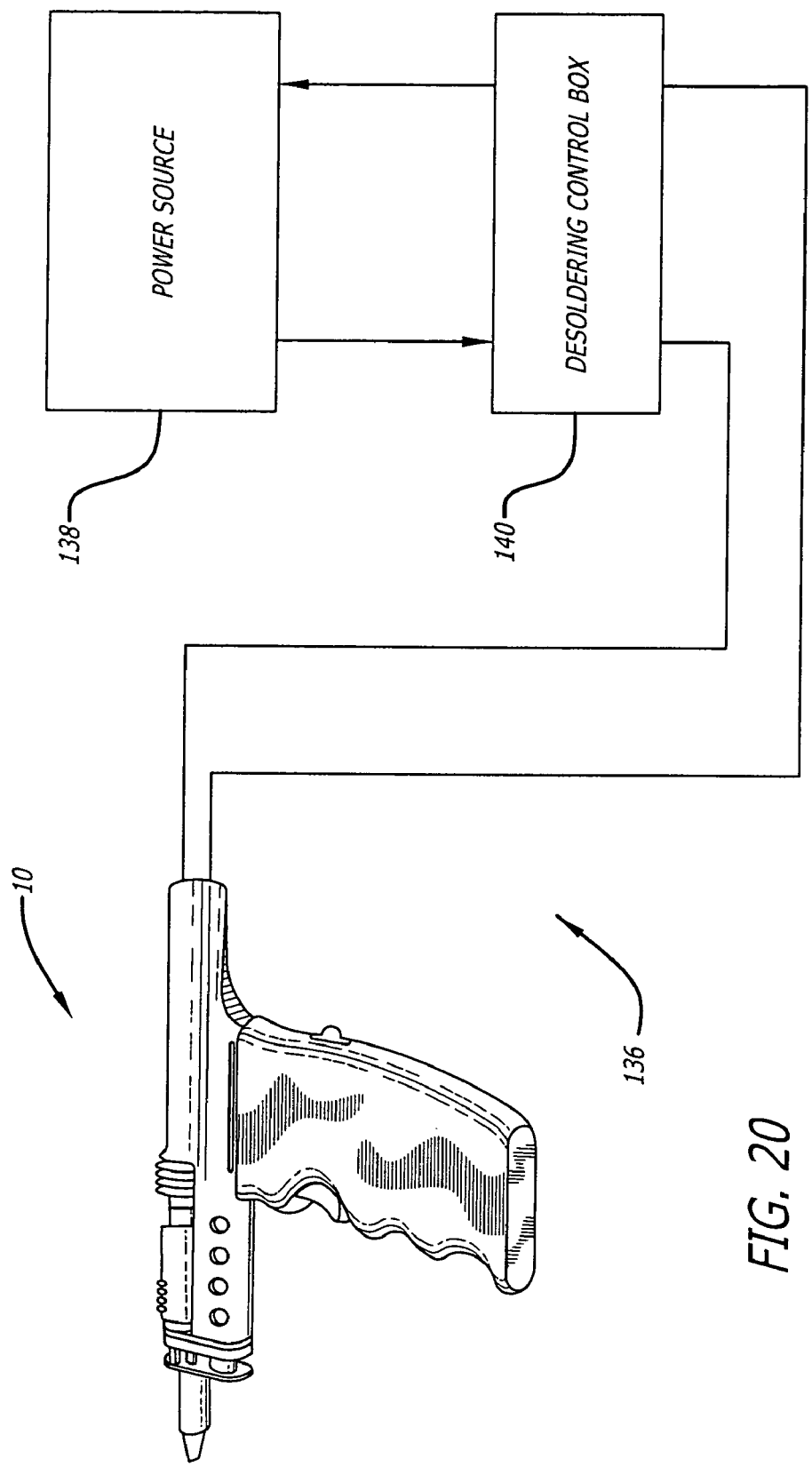
FIG. 20 is a block diagram of the heating system, the power source, and the control box.

FIG. 20 illustrates a desoldering system shown generally at 136 for providing power and vacuum source to the heating system 10. The desoldering system 136 includes a power source 138 that is communicably coupled to a desoldering control box 140, which provides power and vacuum source to the heating system 10. The power source 138 may be any one of pre-existing power sources that may be used to provide power to the soldering tool. For desoldering operations, the desoldering control box 140 may be communicateably coupled to the power source 138, so that the control box 140 may control the power provided to the desoldering system as discussed below. For instance, the power source may be controlled by well known control system such as ON/OFF control and/or PID control, or power source as described in U.S. Pat. No. 6,563,087, which is hereby incorporated by reference into this application.

The desoldering control box 140 may control the supply of power and vacuum to the heating system 10 in the following ways. In general, the heater and the temperature sensor are located near the tip so that the temperature sensor may not accurately reflect the temperature along the entire length of the channel 36. In particular, the pipe 28 may be located further away from the heater than the tip, so that there may be some time delay for temperature near the pipe 28 to rise near the temperature of the tip 38. This means that although the tip 38 may be hot enough to melt the solder on a substrate, the temperature along the channel 36 may not be hot enough to maintain the melted solder from the tip 38 in a melted state along the entire length of the channel 36. As such, solder may solidify within the channel and not pass through the other end of the pipe 28.

Figure 21:
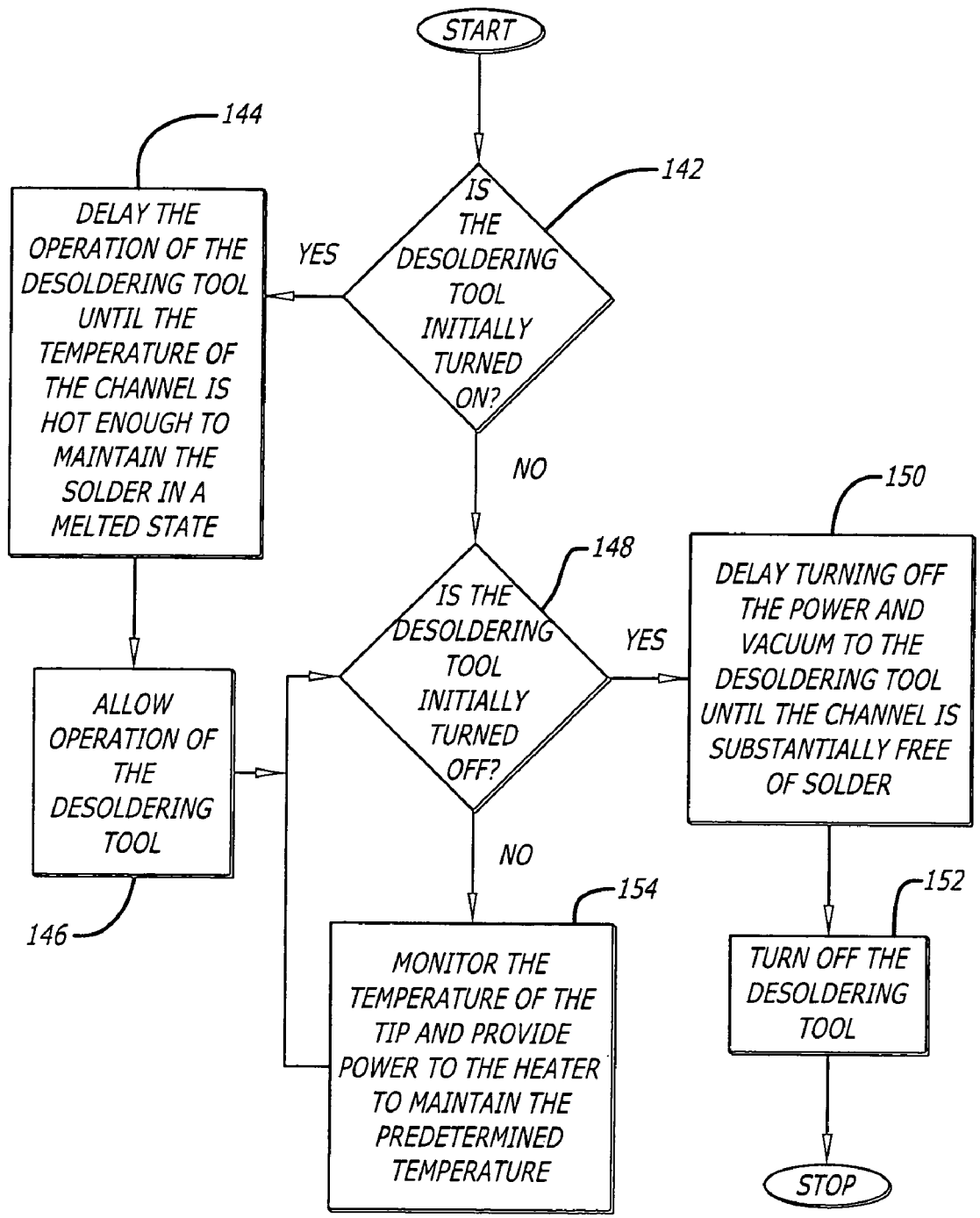
FIG. 21 is a flow chart for operating the heating system.

FIG. 21 illustrates a process in which the desoldering control box 140 may operate the heating system 10 to substantially prevent the solder from solidifying within the channel 36. In step 142, the desoldering control box 140 may monitor whether the desoldering tool 10 is being turned on or not. If the desoldering tool is being turned on in step 144, the desoldering control box may delay the operation of the desoldering tool until the temperature within the channel 36 reaches a temperature such that the melted solder remain in the melted state so that the melted solder may flow through the channel 36 and towards the pipe 28. After the delay in step 146, the control box 140 may allow the operation of the desoldering tool by providing vacuum source to the tip when the first trigger 43 or the second trigger 46 is activated. This may be done for example by providing power to the heater until the substantial portion of the channel 36 reaches a predetermined temperature but not providing vacuum source to the tip until the predetermined temperature along the channel 36 is reached. The delay in step 146 may be between about fifteen and about thirty seconds.

Once the desoldering tool is in operation, in step 148, the control box 140 monitors the operation to determine whether the desoldering tool 10 is being turned off or not. If the desoldering tool is being turned off, in step 150, the control box 140 delays turning off the power and vacuum to the desoldering tool until the channel 36 is substantially free of solder. This way, remaining solder does not clog the channel 36 which may hinder the next operation. In step 152, the desoldering tool is turned off after the delay in step 150. The delay may be between about fifteen seconds and about thirty seconds before turning off the desoldering tool. In step 154, if the desoldering tool is not being turned off, the control box 140 monitors the temperature of the tip and provides sufficient power to the heater to maintain the predetermined temperature. Once the desoldering tool 10 is turned off, the control box 140 may proceed to the steps 150 and 152 to turn off the desoldering tool 10.

While various embodiments of the invention have been described, it will be apparent to those of ordinary skill in the art that many more embodiments and implementations are possible within the scope of this invention. For instance, the heating system 10 may be adapted for a soldering tool rather than as a desoldering tool as discussed above. That is, the first handle 12 can be adapted as a soldering iron with a releasable heater cartridge 16. A user may grip the first handle along the back end of the first handle, which is away from the heater cartridge, for a soldering operation without the need for a vacuum source. If the user prefers a pistol grip, the user may couple the second handle 18 to the first handle 12 to grip around the second handle 18. The second handle may couple to the first handle in a variety of ways and in a variety of orientations. For example, the second handle may be snapped onto the first handle and the second handle may be tangential relative to the first handle such that the first handle is substantially perpendicular to the first handle once the first and second handles are coupled together. In addition, once the first handle is coupled to the second handle, the orientation of the second handle may be adjusted relative to the first handle so that a user may grip the second handle in a comfortable manner. Accordingly, the invention is not to be restricted except in light of the attached claims and their equivalents.

What is claimed is:

1. A desoldering tool having a tip for melting solder and retrieving the melted solder through the tip, the desoldering tool comprising:
   a storage adapted to retain the solder;
   a first handle adapted to couple to a vacuum source and provide a passage within the first handle to convey the vacuum source to the tip to retrieve the melted solder, the first handle having an opening in an exterior side of an exterior-most wall of the first handle, the opening defining a cavity adapted to releasably receive the storage to retain the melted solder retrieved through the tip; and
   a second handle adapted to releasably couple to the first handle in a tangential manner.

2. The desoldering tool according to claim 1, where the first handle has a front end with first and second openings, and further including a heater cartridge having a leading section in a staggered relationship with an electrical cartridge, where the first and second openings are adapted to receive at least a portion of the leading section and the electrical cartridge, respectively.

3. The desoldering tool according to claim 2, where the front end has at least one notch adapted to receive a tooth protruding from the heater cartridge to align the heater cartridge to the first handle.

4. The desoldering tool according to claim 1, where the first handle has a back holder adapted to move between a first position and a second position, where in the first position the longitudinal length of the cavity is longer than the length of the storage to allow the storage to be inserted or removed from the cavity, where in the second position the length of the cavity is at least equal to the length of the storage to hold the storage within the cavity.

5. The desoldering tool according to claim 4, where the storage has a first end and a second end and further including first and second seal members within the cavity adapted to substantially seal the first and second ends of the storage within the cavity in the second position.

6. The desoldering tool according to claim 5, where the first seal member and second seal member each has a bevel edge along its outer edge.

7. The desoldering tool according to claim 5, where the second seal member is releasably coupled to the back holder, where the second end of the storage has a divot adapted to receive a key formed on the second seal member when the back holder is in the second position.

8. The desoldering tool according to claim 4, where the storage has a divot adapted to receive a key when the back holder is moved from the first position to the second position to orient the storage relative to the first handle.

9. The desoldering tool according to claim 2, further including a power line coupled to the first handle to provide power to the leading section to convert the power to heat for heating the tip.

10. The desoldering tool according to claim 1, further including a heater cartridge having a channel adapted to retrieve the melted solder therethrough, where the longitudinal axis of the channel is substantially aligned with a longitudinal axis of the passage.

11. The desoldering tool according to claim 9, where the first handle has a first trigger and the second handle has a second trigger, when the second handle is releasably coupled to the first handle, the second trigger is mechanically coupled to the first handle so that actuation of the second trigger actuates the first trigger to provide vacuum source to the tip.

12. A system for melting solders with a tip and removing the melted solder through the tip, the system comprising:
   a storage adapted to retain the removed solder;
   a first handle coupled to a power line to provide power to a heater to convert the power to heat near the tip to melt the solder, having a first trigger to control a vacuum source to the tip, and having an opening in an exterior side of an exterior-most wall of the first handle, the opening defining a cavity adapted to accept the storage; and
   a second handle adapted to releasably couple to the first handle in a tangential manner, the second handle having a second trigger that is mechanically coupled to the first trigger when the second handle is coupled to the first handle such that actuation of the second trigger causes the first trigger to turn on or off a vacuum source to the tip for removing the melted solder through the tip.

13. The system according to claim 12, further including a storage capable of retaining the melted solder retrieved through the tip, where the first handle is adapted to couple to the vacuum source and provide a passage within the first handle to provide the vacuum source to the tip to retrieve the melted solder, the first handle having a cavity adapted to releasably receive the storage to retain the melted solder retrieved through the tip.

14. The system according to claim 13, where the first handle has a front end with a first opening, and further including a leading section with a channel adapted to retrieve the melted solder therethrough and the longitudinal axis of the channel is substantially aligned with the longitudinal axis of the passage.

15. The system according to claim 12, where the first handle has a front end with first and second openings, and further including a heater cartridge having a leading section in a staggered relationship with an electrical cartridge, where the first and second openings are adapted to receive at least a portion of the leading section and the electrical cartridge, respectively.

16. The system according to claim 15, further including a heater cartridge remover adapted to associate with the heater cartridge to remove the heater cartridge from the first handle.

17. The system according to claim 16, where the heater cartridge remover is adapted to associate with an underside of the heater cartridge.

18. The system according to claim 13, where the first handle has a back holder adapted to move between a first position and a second position, where in the first position the longitudinal length of the cavity is longer than the length of the storage to allow the storage to be inserted or removed from the cavity, where in the second position the length of the cavity is at least equal to the length of the storage to engage the storage within the cavity.

19. The system according to claim 13, where the storage has a first end and a second end and further including first and second seal members within the cavity adapted to substantially seal the first and second ends of the storage within the cavity in the second position.

20. The system according to claim 19, where the second seal member is releasably coupled to the back holder, where the second end of the storage has a divot adapted to receive a key formed on the second seal when the back holder is in the second position.

21. The system according to claim 13, where the storage has a divot adapted to receive a key when the back holder is moved from the first position to the second position to orient the storage relative to the first handle.

22. The system according to claim 15, further including a power line coupled to the first handle to provide power to the heater within the leading section to convert the power to heat for heating the tip.

23. The system according to claim 12, further including a heater cartridge having a channel adapted to retrieve the melted solder therethrough, where the longitudinal axis of the channel is substantially aligned with a longitudinal axis of the passage.

24. The system according to claim 22, where the first handle has a first trigger and the second handle has a second trigger, when the second handle is releasably coupled to the first handle, the second trigger is mechanically coupled to the first handle so that actuation of the second trigger actuates the first trigger to provide vacuum source to the tip.

25. The system according to claim 23, where the second handle includes a pin that is adapted to move between a first position and a second position, where in the first position the pin protrudes from the second handle and in the second position the pin is recessed within the second handle, where the pin is sized to fit inside the channel for cleaning.

26. The system according to claim 23, further including a heater cartridge remover adapted to engage with the heater cartridge to remove the heater cartridge from the first handle.

27. The system according to claim 12, further including a desoldering control box capable of delaying providing the vacuum source to the tip.

28. The system according to claim 12, further including a heater cartridge having a transition section adapted to couple a leading section and an electrical cartridge in a staggered manner, where the transition section has a sleeve protruding from one side adapted to receive an electrical cartridge and an pipe end of the leading section protruding from the same side of the transition section, where the pipe end and the sleeve are adapted to insert into first and second openings of the first handle, respectively, with the sleeve engaging with the second opening before the pipe end engages with the first opening to orient the heater cartridge relative to the first handle.

29. The system according to claim 28, where the sleeve has a cavity adapted to engage with a hinge within the second opening to substantially prevent the heater cartridge from disengaging with the first handle.

30. The system according to claim 29, where the hinge is coupled to a button when activated causes the hinge to release the sleeve to disengage the heater cartridge from the first handle.

31. A desoldering tool comprising:
   a desoldering tip having a desoldering channel;
   a first handle having a recess in an exterior side of an exterior-most wall of the first handle, the recess defining a cavity to releasably receive the storage, the first handle supporting the desoldering tip and adapted to couple to a vacuum source to withdraw melted solder through the desoldering channel;

a first actuator on the first handle and adapted to allow a user of the desoldering tool who is holding the first handle to control the communication of the vacuum source with the desoldering channel;
a second handle
a second actuator on the second handle;
the second handle being adapted to couple to the first handle in a coupled position and to subsequently be uncoupled therefrom by a user; and
the second actuator when the second handle is in the coupled position being adapted to allow a user of the desoldering tool who is holding the second handle to control the communication of the vacuum source with the desoldering channel.

32. The desoldering tool of claim 31, wherein the first actuator is a user-actuable first trigger and the second actuator is a user-actuable second trigger.

33. The desoldering tool of claim 31, further comprising means for operatively connecting the second actuator to the first actuator when the second handle is in the coupled position.

34. The desoldering tool of claim 31, wherein the second handle forms a pistol grip handle and the second actuator forms a trigger on the pistol grip handle.

35. The desoldering tool of claim 31, further comprising a releasable locking means for locking the second handle to a bottom surface of the first handle in the coupled position.

36. A desoldering tool heater cartridge assembly unit, comprising:
a desoldering tool tip;
a heater cartridge positioned to heat solder in the desoldering tool tip, the tool tip and the heater cartridge defining a solder suction channel having a longitudinal channel axis connectable to a vacuum source;
a storage for receiving the solder;
a handle having an opening in an exterior side of an exterior-most wall of the handle, the opening defining a cavity sized to receive the storage;
an elongated electrical cartridge having a longitudinal cartridge axis and connectable to an electrical power source, the longitudinal cartridge axis being offset from and parallel to the longitudinal channel axis; and
a transition section electrically connecting the electrical cartridge to the heater cartridge.

37. The cartridge assembly unit of claim 36, wherein the transition section includes gap means defining a gap and electrical conductor wiring in the gap.

38. The cartridge assembly unit of claim 37, wherein the gap means includes a pair of plates disposed perpendicular to the cartridge axis and the channel axis.

39. The cartridge assembly unit of claim 36, wherein the heater cartridge surrounds a rearward portion of the desoldering tool tip.

40. The cartridge assembly unit of claim 36, further comprising a pipe extending rearwardly from the solder suction channel.

41. The cartridge assembly unit of claim 36, further comprising a sleeve surrounding a forward portion of the electrical cartridge.

42. A system for melting solder through a tip, the system comprising:
a storage for accepting melted solder;
a first handle having a first trigger, a longitudinal axis, and an opening in an exterior side of an exterior-most wall of the first handle, the opening defining a portion of a cavity, the cavity adapted to receive the storage through the opening, where activation of the first trigger provides power to the tip to melt solder; and
a second handle having a grip area with a second trigger, where the first and second handles are adapted to couple together such that the grip area of the second handle is tangential relative to the longitudinal axis of the first handle and activation of the second trigger causes activation of the first trigger to provide power to the tip.

43. The system according to claim 42, where the first handle is adapted to provide vacuum source to the tip to remove the melted solder through a channel within the tip.

44. The system according to claim 42, where the first handle is capable of operating independently from the second handle to provide power to the tip.

45. The desoldering tool according to claim 1, where the first handle has a first trigger and the second handle has a second trigger.

46. The desoldering tool according to claim 45, where when the second handle is releasably coupled to the first handle, the second trigger is mechanically coupled to the first handle so that actuation of the second trigger actuates the first trigger to provide vacuum source to the tip.

47. The desoldering tool according to claim 45, further comprising means for operatively connecting the second trigger to the first trigger when the second handle is coupled to the first handle.

48. The desoldering tool according to claim 1 where the first handle forms a pen-type handle and the second handle when coupled to the first handle forms a pistol grip-type handle.

49. The desoldering tool according to claim 1, further comprising a releasable locking means for locking the second handle to a bottom surface of the first handle.

50. The desoldering tool according to claim 1, where the first handle is capable of operating independently from the second handle to provide power to the tip.

51. The system according to claim 12, where the first handle and the first trigger together form a pen-type trigger handle, and the second handle and the second trigger together form a pistol-grip trigger handle.

52. The system according to claim 42, where the first trigger is directly user operable when the second handle is not coupled to the first handle.

53. The system according to claim 42, where the first handle and the first trigger together form a pen-type trigger handle, and the second handle and the second trigger together form a pistol-grip trigger handle.

54. The system according to claim 42, further comprising locking means for releasably locking the second handle to a bottom surface of the first handle.

55. A desoldering tool comprising:
a desoldering tip having a desoldering channel;
a first handle supporting the desoldering tip and operatively communicable with a vacuum source;
a solder collection storage cartridge;
an exterior-most wall of the first handle having a recess in an exterior side of the exterior-most wall, the recess defining a solder collection storage cartridge cavity;
the cavity being adapted such that when the solder collection storage cartridge is operatively positioned in the cavity, the cartridge is communicable with the vacuum source to suck solder through the desoldering channel into the cartridge;
the cavity being adapted to allow the cartridge to be directly inserted into and removed from the cavity without opening the first handle;

the first handle having a first trigger;

a second handle having a second trigger; and the second handle being releasably couplable to the first handle.

56. The desoldering tool of claim 55, wherein the first trigger is operatively connectable to the vacuum source.

57. The desoldering tool of claim 56, wherein when the second handle is releasably coupled to the first handle, the second trigger is operatively connected to the first trigger.

58. The desoldering tool of claim 57, wherein the solder collection storage cartridge has a housing and a U-shaped radiation member, the radiation member having a surface spaced apart from the housing and an edge attached to the housing, and the second trigger when actuated operates the vacuum source to suck melted solder into the housing.

59. The desoldering tool of claim 55, further comprising the first handle having a passage, a forward end of the passage communicating with a rearward end of the solder collection storage cartridge when in the cavity, and a rearward end of the passage communicable with the vacuum source, wherein longitudinal centerlines of the desoldering channel, the cartridge and the passage are aligned.

60. The desoldering tool of claim 55, wherein the cavity is at a forward top area of the first handle.

61. The desoldering tool of claim 55, wherein the first handle and the first trigger together form a pen-type trigger handle, and the second handle and the second trigger together form a pistol-grip trigger handle.

62. The desoldering tool of claim 55, wherein when the second handle is releasably coupled to the first handle, the second trigger is operatively connected to the first trigger.

63. The desoldering tool of claim 55, wherein the solder collection storage cartridge has a housing and a U-shaped radiation member, the radiation member having a surface spaced apart from the housing and an edge attached to the housing, and the second trigger when actuated operates the vacuum source to suck melted solder into the housing.

* * * * *